Figure 6:
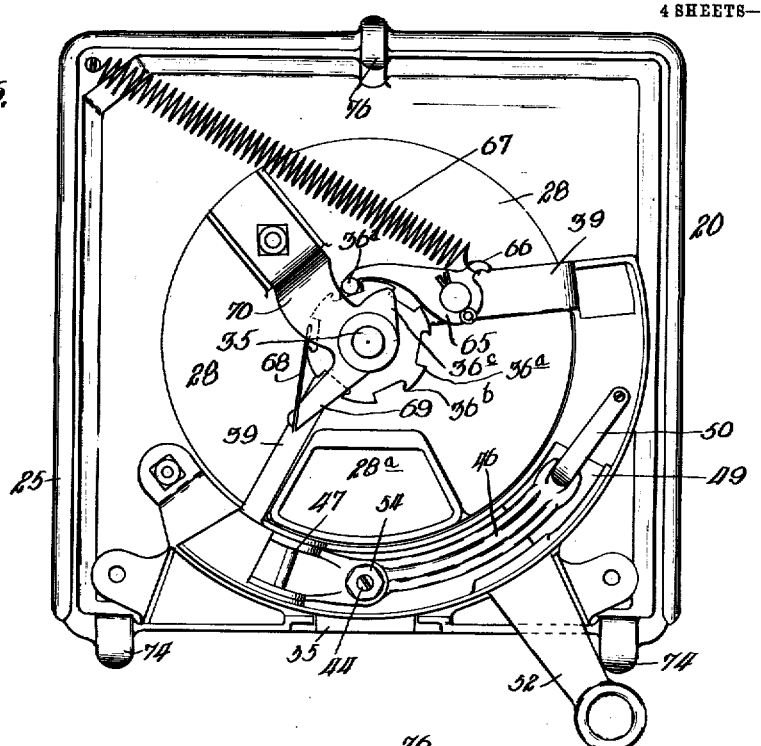

B. M. DAVIS.
VENDING MACHINE.
APPLICATION FILED JULY 11, 1908.
929,568.
Patented July 27, 1909.
4 SHEETS—SHEET 1.
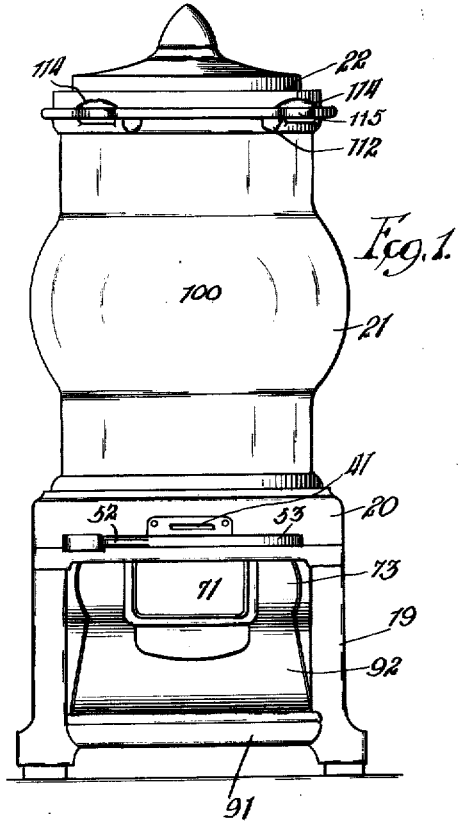
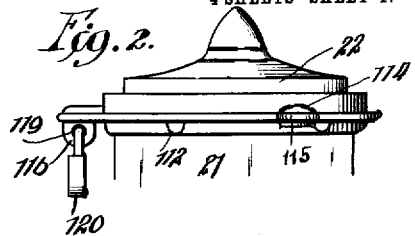
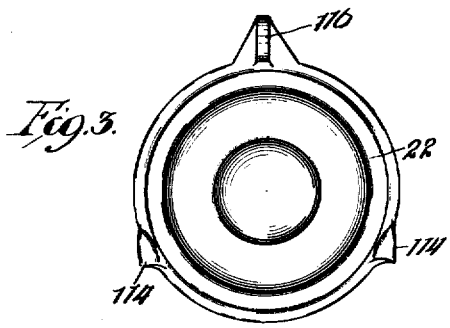
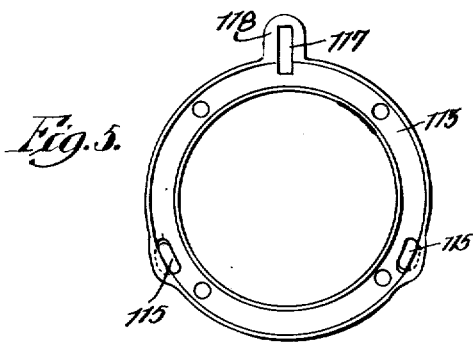
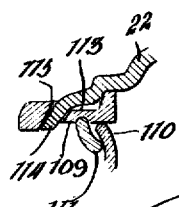
Witnesses:
Inventor:
Bethuel M. Davis

B. M. DAVIS.
VENDING MACHINE.
APPLICATION FILED JULY 11, 1908.

929,568.

Patented July 27, 1909.
4 SHEETS—SHEET 2.

B. M. DAVIS.
VENDING MACHINE.
APPLICATION FILED JULY 11, 1908.
929,568.
Patented July 27, 1909.
4 SHEETS—SHEET 3.
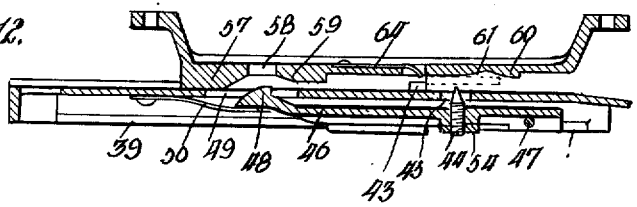
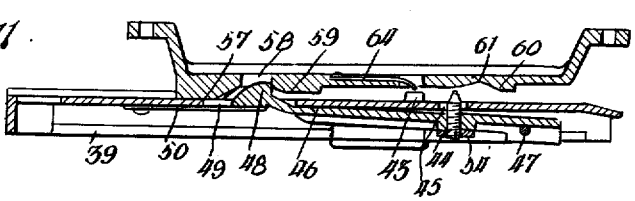
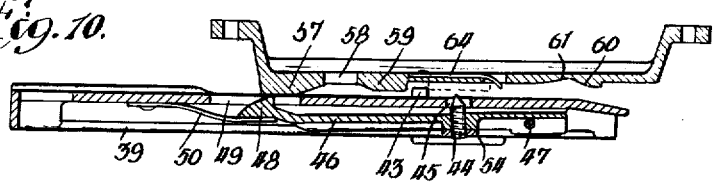
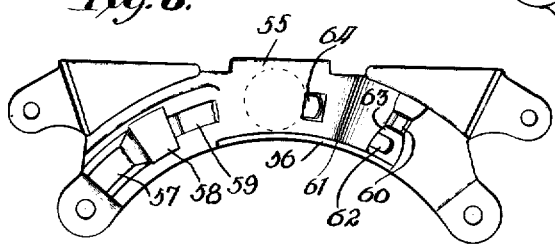
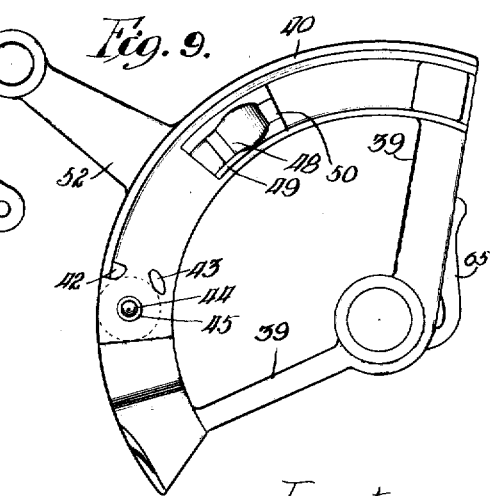
Witnesses:
Inventor:
Bethuel M. Davis.
by
Attys.

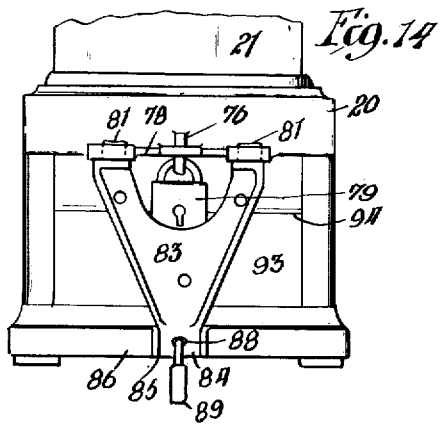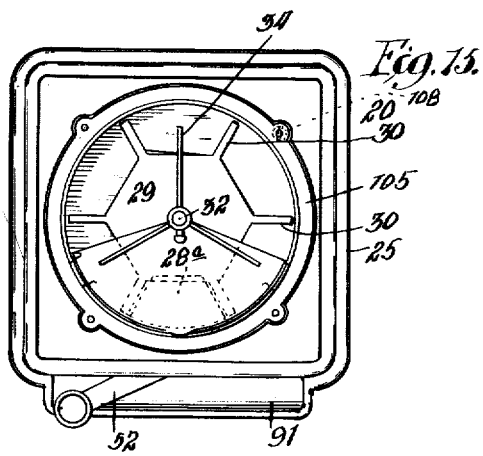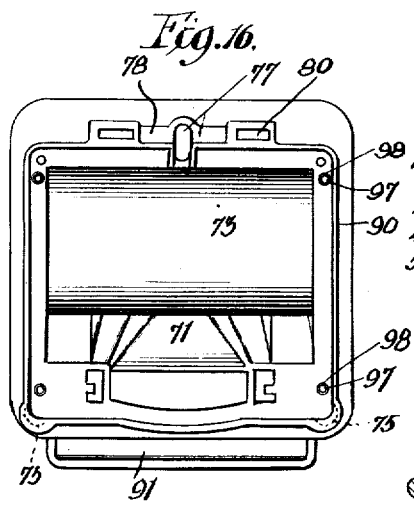

UNITED STATES PATENT OFFICE.

BETHUEL M. DAVIS, OF MORRIS, ILLINOIS, ASSIGNOR TO JOSEPH G. COLEMAN, OF CHICAGO, ILLINOIS.

VENDING-MACHINE.

No. 929,568.      Specification of Letters Patent.      Patented July 27, 1909.

Application filed July 11, 1908. Serial No. 442,873.

*To all whom it may concern:*

Be it known that I, BETHUEL M. DAVIS, a citizen of the United States, residing at Morris, in the county of Grundy and State of Illinois, have invented certain new and useful Improvements in Vending-Machines, of which the following is a specification.

This invention relates more especially to a peanut vending machine; and the principal object of the invention is to so construct and locate the actuating mechanism that the peanuts will be discharged from around the edge of the jar or receptacle rather than from the center thereof, whereby the mass of peanuts will be agitated during each discharge, so that no portion of the mass of peanuts will be banked in the receptacle in such a manner as to remain undischarged for any considerable period of time in the ordinary operation of the machine.

In certain previous constructions, the discharge has been from the center of the mass, which tended to assume a funnel formation, whereby a considerable mass of peanuts around the edge of the receptacle remained undisturbed so that it became necessary to refill the receptacle before such peanuts had been discharged, with the result that the peanuts so massed and undisturbed had a tendency to become stale or rank.

The present invention contemplates a construction which employs a rotatable pocketed plate or carrier, which directly underlies the mass of peanuts which fill into the pockets or receptacles around the periphery of such carrier prior to a discharging movement, thereby preventing the formation of a funnel or vortex in the center of the mass, and serving to agitate the mass with each movement of the carrier.

The invention further relates to the construction and arrangement of the coin actuated mechanism, which carries the coin along in such a manner as to prevent scratching or mutilation of the coin; and is further adapted to detect slugs or tokens which are thrown into the coin box, without, however, actuating the mechanism, thereby preventing the return of such slugs or tokens to the user for subsequent fraudulent manipulation.

The invention further relates to the means employed for securing the coin actuated mechanism to the peanut receptacle in such manner as to permit the entire coin mechanism to be exposed to view by lifting the upper portion of the machine from the base, which greatly facilitates repair or readjustment of the mechanism.

The invention also relates to the means employed for securing the cover to the receptacle, and to the machine as a whole and the individual parts thereof.

The invention consists in the features of construction and combination of parts hereinafter described and claimed.

Figure 7:
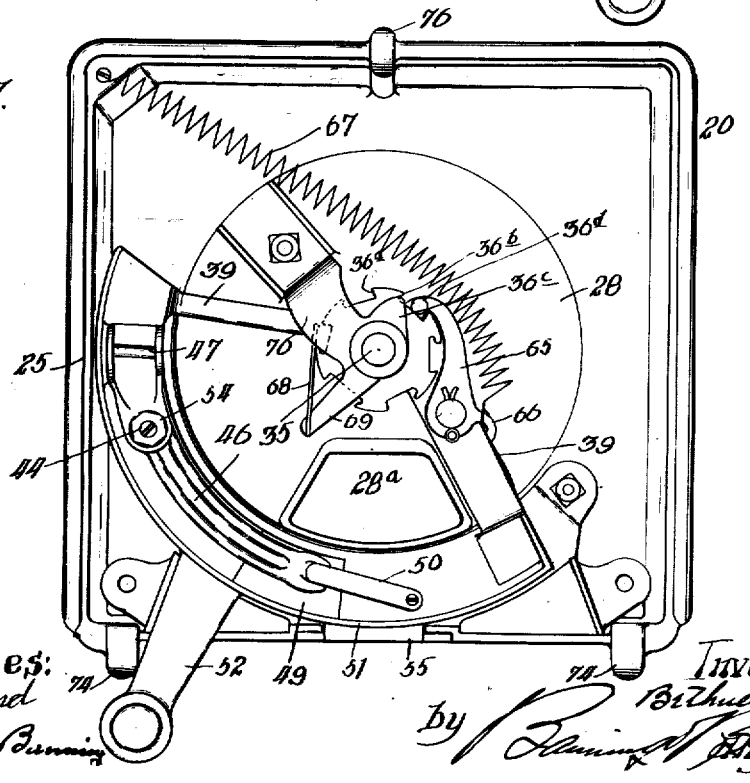

In the drawings, Figure 1 is a front elevation of the entire machine; Fig. 2 a side elevation of the upper portion thereof, showing the cap or cover in position; Fig. 3 an under face view of the cap or cover; Fig. 4 an enlarged sectional detail, showing the method of securing the cap or cover to the glass receptacle; Fig. 5 a top or plan view of the top ring of the glass receptacle; Fig. 6 an under face view of the coin actuated mechanism, in initial position; Fig. 7 a similar view, showing the mechanism in discharging position; Fig. 8 a detail plan view of the roof of the coin trackway; Fig. 9 a detail plan view of the upper face of the swinging coin carrier, which co-acts with the trackway; Figs. 10, 11 and 12, sectional views, taken on the line of curvature 10—10, shown in Fig. 6; Fig. 13 a vertical section, taken through the base of the machine; Fig. 14 is a rear elevation of the machine, the top portion being cut away; Fig. 15 a plan view of the pocketed carrier and stirrer; Fig. 16 a plan view of the base of the machine, with the coin actuated mechanism removed; Fig. 17 a sectional detail, showing the clamp for the lower edge of the glass jar or receptacle; and Fig. 18 a plan view of the clamping ring for the glass jar.

As shown in Fig. 1, the machine as a whole comprises a base portion 19, a casing 20 for the coin actuated mechanism, a glass jar or receptacle 21, and a cap or cover 22. The casing 20, which carries the coin actuated and peanut discharging mechanism, is best shown in section in Fig. 13, and is of generally rectangular form comprising an outer front wall 23, a rear wall 24, and side walls 25, although obviously the casing could be of circular or other formation adapted to contain the mechanism. The casing further comprises a flat top floor 26, in the center of which is a circular cup-shaped concavity 27, having a bottom 28 provided, near its front side, with a flanged discharge opening 28ª.

Inside the cup shaped concavity is located a rotary carrier 29 provided, around its periphery, in the form shown, with six radially arranged flanges 30 which extend substantially up to the surrounding circular wall of the concavity, and furnish, in effect, six pockets or receptacles for the peanuts which enter said spaces from the mass above which finds its floor on the bottom of the concavity, save only as regards the front portion thereof which is provided with a cut-off plate 31 immediately above the discharge opening 28, under which plate the flanges or spokes of the carrier are adapted to travel. The carrier is provided with an upwardly extending stub shaft 32 which is entered through a hole 33 in the plate 31, and said stub shaft has mounted thereon a stirrer, in the form of three radiating blades 34 which serve to agitate the peanuts as the carrier is rotated. The carrier is further provided with an actuating stub shaft 35, which passes through the center of the floor 28 and is squared to receive a six-toothed ratchet wheel 36, between which and the floor 28 is loosely journaled the hub 37 of a swinging coin carrier 38. The teeth of the ratchet wheel are provided with actuating shoulders 36ª and stop shoulders 36ᵇ.

The coin carrier 38 is in the form of a curved plate having the arc of one-third of a circle, which curved plate is connected with the hub by means of spokes or arms 39. The coin carrier plate is of a size to swing around the outside of the front portion of the curved wall of the concavity 27, the arms or spokes being slightly offset to pass under the floor of the concavity. The upper or acting face of the plate 38 is shown in Fig. 9 and is provided with a flange 40, which terminates at a point near the end of the plate and is adapted to register with the coin slot 41 in the front of the casing, when the swinging plate is in its initial position. The end of the flange 40 is thickened to provide an outer lug 42 which coöperates with an inner lug 43, the two lugs being so positioned as to engage the rear edge of a coin inserted through the slot, as shown in dotted lines in Fig. 9. Immediately forward of the lugs 42 and 43, as regards the line of travel which is indicated by the arrow, is located a tapered pin 44, the point of which normally projects upwardly through an opening 45 in the floor of the plate, which pin is entered through a curved lever arm 46, best shown in Figs. 6 and 7. The lever is pivoted, at its rear end, a short distance behind the pin 44, by means of a pivot pin 47, and the forward end of the curved lever arm is provided with an upwardly extending tooth 48 which normally projects through an opening 49 in the floor of the swinging plate, being held in such position by means of a flat spring 50 secured to the lower side of the swinging plate. The swinging plate is provided with a depending flange 51, from which outwardly extends a handle 52 adapted to travel within a slot 53 in the front of the casing, which handle occupies a position convenient of access to the purchaser. The tapered pin 44 is adapted to be adjusted to the proper position of projection and to be locked in such adjusted position by means of a lock nut 54.

The swinging plate coöperates with a curved fixed plate 55, shown in detail in Fig. 8, which fixed plate occupies a position immediately above the swinging plate and has a curvature concentric therewith. The fixed plate 55, immediately overlies the swinging plate, a sufficient space being provided between the two plates to permit of the passage of the coin carried by the swinging plate or coin carrier, which space is maintained by the contact of the flange 40 on the swing plate against the surface of the super-adjacent fixed plate, and by the contact of an inner flange 56 on the inner edge of the fixed plate against the surface of the swinging plate. The fixed plate is provided, at its rear end, as regards the travel of the coin (which is indicated by an arrow in Fig. 8), with a lug 57 against which the upwardly extending tooth 48 rests when the swinging plate is in position to receive a coin immediately above the spring supported pin 44, which, in this position of adjustment, will be depressed below the level of the surface of the swinging plate immediately behind the lugs 42 and 43. Immediately in front of the lug 57 is a hole 58 which permits the finger 48 to spring upwardly, when released from contact with the lug 57, into position to engage the forward edge of the hole 58 and lock the swinging plate or coin carrier against movement, save only when a coin of the proper size and denomination is inserted into position. Immediately forward of the hole 58 is a lower lug 59 which serves to engage the tooth 48 when the latter is moved past the hole 58; and the lug 59 serves to depress the tooth 48 sufficiently to permit the coin to ride under a tooth 60 without being engaged by the tapered pin 44. The surface of the plate 55 forming the trackway for the coin, immediately to the rear of the beveled tooth 60, is given an oblique formation at the point 61, which surface slopes inwardly to the base of the inverted tooth 60. Laterally adjacent the tooth 60 is a flat spring stop 62, the end of which projects through an opening 63 in the plate 55, which spring is adapted to bear against and hold the coin against displacement after it has reached a position adjacent the base of the tooth 60. A similar spring stop 64 is provided, which serves to prevent withdrawal of the coins by means of a string or wire.

One of the arms or spokes 39 of the swinging coin carrier has pivoted thereto a dog 65, provided with a finger 66 which receives the end of a spring 67 adapted to hold the end of the dog between the teeth of the wheel 36. Adjacent the dog is a cam 36ᶜ which engages a pin 36ᵈ on the dog and causes the latter, on its return movement, to spring back sufficiently to clear the stop shoulders of the teeth, which latter normally engage the dog in such manner as to prevent turning of the carrier save by the action of the dog. The return movement of the ratchet is prevented by a spring stop 68 which is secured to the arm 69 of a bracket 70 which carries the cam 36ᶜ and through which the end of the stub shaft 35 is entered. The operation of the coin actuated mechanism is as follows:

The coin is inserted into the slot and occupies the position on the carrier-plate indicated by dotted lines in Fig. 9, and rests beneath the fixed plate at the point indicated by dotted lines in Fig. 8. In this position the coin will be engaged by the lugs 42 and 43 and overlie the point of the pin 44. In like manner the tooth 48, at the opposite end of the lever arm 46, will engage the lug 57 so that the tapered pin 44 will be held out of contact with the overlying coin. An initial movement of the swinging coin carrier will bring the tooth 48 into register with the hole 58, and the tooth will engage the edge of the hole, unless the interposed coin be of the proper denomination to actuate the machine. If the coin be one of the proper denomination it will have a diameter just sufficient to bridge the space between the spring stop 64 and the inverted apex of the tooth 60 and be of a proper thickness to force back the pin 44 a sufficient distance to depress the tooth 48 and prevent its engagement with the edge of the hole 58. If a slug or token of less diameter than the intended coin be employed, the lugs 42 and 43, by their initial movement, will fail to carry the forward edge of the slug or token to the inverted apex of the tooth 60, so that the tooth 48 will engage the hole 58, regardless of the presence in the machine of the slug or token. In like manner, the bevel of the plate 55, at the point 61, is such that coins, slugs or tokens, instead of lying flat against the surface of the plate, will bridge the space between the plate and the inverted apex of the tooth 60, at the same time maintaining contact with the pointed or tapered end of the pin 44. In these circumstances, if a slug of paper or soft metal, like lead, be employed, the tapered point of the pin will bend or pierce the slug, so that the pin will not be depressed and the swinging plate unlocked.

If a coin of proper denomination be used, the tooth 48 will be held depressed by the contact of the pin against the coin, which is held centered under the pin at all points in its line of travel, and this depressing of the tooth 48 will cause it to ride past the hole or opening 58 as the coin moves under the inverted apex of the tooth 60, thereby enabling the swinging plate or coin carrier to continue its movement, which causes the dog 65 to engage one of the teeth of the ratchet wheel and move around the rotary carrier until one of the pockets or divisions thereof, between adjacent flanges 30, is brought into register with the discharge opening 26, which allows the peanuts to fall into a chute 71 formed in the base of the machine, which chute discharges into an open mouth 72 adapted to permit the insertion of the purchaser's hand. Simultaneously with the discharge of the peanuts, the coin falls into a coin box 73. Slugs or false tokens which fail to actuate the machine are held in position between the spring 64 and the inverted tooth 60, and are carried forward by the next coin inserted into the machine, so that such slugs or tokens will be collected in the coin box and will not be returned to the user for further fraudulent manipulation.

The casing for the mechanism is provided, at its forward lower edge, with a pair of ears 74 which are entered into a corresponding pair of recesses or concavities 75 in the front corners of the base portion of the machine, and thereafter the casing is dropped into place to bring a depending lug 76 on the back of the casing into register with a hole 77 formed in a flange 78 outwardly extending from the rear edge of the base. The lug 76 is provided with a hole adapted to permit the insertion therethrough of a padlock 79, which, when the parts have been assembled, as indicated, serves to lock them together. The flange 78, at its ends, is provided with a pair of slots 80 which are adapted to receive a pair of fingers 81 upwardly extending through a pair of forwardly extending arms 82 which are connected to a bracket 83 of Y formation, which bracket is adapted to be secured to a wall, post or other structure. The base of the bracket has depending therefrom a lug 84, which enters a concavity 85 in the lower rear edge 86 of the base, and the lug is provided with a hole 87 which registers with a hole 88 in the inner wall of the concavity, which arrangement permits insertion of a padlock 89 through such registering holes, thereby locking the machine to the bracket and at the same time providing suitable points of support for the machine.

The base, as a whole, comprises an upper section, which is dished in the rear portion to provide the floor of the coin receptacle 73, and is tapered in the front portion to provide the chute 71. The upper portion, around its edge, is provided with a flange 90 which is adapted to receive the edge of the casing, which edge slightly overlies the flange when the parts are assembled. The lower portion of the base, in its front, is provided with a dish-shaped floor 91, the rear wall 92 of which is upwardly extended sufficiently to abut against the dished wall of the coin receptacle 73. The latter is further supported by means of a rear cross wall 93 which registers with a lug 94 on the under side of the dished wall of the coin receptacle; and the two sections are inclosed by the provision of side walls 95, the sections being held together by means of vertical tie rods 96 located at the corners. In order to prevent displacement of the side walls, the latter are provided with upper dowell pins 97, which pass through holes 98 in the margin of the upper section of the base, and similar lower dowell pins 99, entered through holes, not shown, near the side margins of the lower section of the base.

The peanuts are contained within the glass jar or receptacle 21 which, in the form shown, is of cylindrical formation, bulged in its center 100 and provided, at its lower periphery, with a flange 101, which rests upon a rubber washer 102 supported within a continuous channeled ring 103, which is secured by screws 104 within a channel 105 formed on the top of the casing. The glass flange 101 is held in position by means of a split clamping ring 106, the sections of which are provided with ears 107 through which are entered screws 108.

The jar or receptacle is provided, at its top, with a ring or collar 109, against which the flared upper rim or margin 110 of the glass or jar abuts, and the ring or collar is secured to the glass jar by means of a split clamping ring 111 which engages the periphery of the jar below the flared upper margin and is secured to the ring or collar by suitable screws, not shown, entered through the ring or collar and into the protuberant lugs 112 in the split ring. The collar is provided with a channel 113 in its upper face, which channel receives the rim of the cap 22, which is provided, on its front side, with a pair of obliquely projecting fingers 114, which enter into undercut recesses 115 in the collar, and the cover, in addition, is provided with a depending lug 116, which enters a corresponding slot 117 formed in the lip 118 which outwardly projects from the rear margin of the collar. The depending lug is provided with a hole 119 adapted to receive a padlock 120.

The method of forming the base is one which permits ready access to the coin receptacle, which occupies the upper portion of the base structure; and the method of securing the casing to the base and securing the base to the wall or other supporting structure, is one which provides an easy means of assembling or disassembling or removing the various parts of the machine as a whole.

The method of securing the clamping ring to the top of the jar or receptacle is one which obviates the necessity for using tie rods or other connections inside of the jar or receptacle, leaving the latter entirely free for the reception and distribution of the peanuts.

The arrangement of the coin actuated mechanism is one which provides an extremely simple and effective method of detecting slugs or tokens, and at the same time prevents scratching or mutilation of the coin during its travel to the coin box. Furthermore, the straight line of travel of the coin enables the mechanism to be assembled very compactly and to be located at a point easy of access. By forming the ratchet wheel in the manner indicated, revolution of the pocket and carrier in either direction will be prevented, save only when the dog is thrown by movement of the swinging coin carrier. This prevents any one actuating the machine by inserting the finger or a wire or other instrument into the discharge chute and turning the commodity carrier without actuating the dog. The dog serves both as a lock against such fraudulent manipulation and as an actuating means for effecting a discharge.

What I regard as new and desire to secure by Letters Patent is:

1. In a vending machine, the combination of a swinging coin carrier plate adapted to receive and hold a coin and convey the same from its point of insertion to its point of discharge, a coin trackway adjacent the swinging coin carrier, a catch for holding the swinging coin carrier normally locked, means secured to and movable with the coin carrier and adapted to be engaged by the coin when positioned on the carrier for releasing the catch, and means actuated by the movement of the coin carrier for discharging a vendible commodity, substantially as described.

2. In a vending machine, the combination of a swinging coin carrier plate adapted to receive and hold a coin and convey the same from its point of insertion to its point of discharge, a coin trackway adjacent the swinging coin carrier, a catch for holding the swinging coin carrier normally locked, means secured to and movable with the coin carrier and adapted to be engaged by the coin when positioned on the carrier for releasing the catch, a rotatable pocketed member adapted to be revolved by the movement of the swinging coin carrier, and a chute adapted to receive a vendible commodity from one of the pockets of said member when turned in discharging position, substantially as described.

3. In a vending machine, the combination of a movable coin carrier adapted to receive and hold a coin and convey the same from its point of insertion to its point of discharge, a catch member mounted on said coin carrier, a stationary member adapted to be engaged by said catch member for normally locking the coin carrier, means actuated by the insertion of a proper coin when positioned on the carrier for holding the catch in releasing position, and a discharge member actuated by a movement of the coin carrier, substantially as described.

4. In a vending machine, the combination of a movable coin carrier adapted to receive and hold a coin and convey the same from its point of insertion to its point of discharge, a catch member mounted on said coin carrier, a stationary member adapted to be engaged by said catch member for normally locking the coin carrier, means actuated by the insertion of a proper coin when positioned on the carrier for holding the catch in releasing position, a rotatable pocketed commodity carrier adapted to be partially rotated by a movement of the swinging coin carrier, and a chute co-acting with the pocketed carrier for receiving the commodity discharged from one of the pockets, substantially as described.

5. In a vending machine, the combination of a swinging coin carrier, a lever pivoted to said carrier and provided with a tooth, and further provided with a pin adapted to engage a coin when inserted, a coin trackway adjacent the swinging coin carrier and provided with an abutment adapted to be engaged by the tooth on the pivoted lever, save when a coin of proper denomination is in engagement with the pin, and a discharge member actuated by a movement of the coin carrier, substantially as described.

6. In a vending machine, the combination of a casing, a commodity carrier rotatably mounted within the casing, a swinging coin carrier adapted to actuate the rotatable commodity carrier, a catch member normally adapted to lock the coin carrier in non-operating position, and means adapted to be engaged by an inserted coin for holding the catch member in unlocked position and permitting a complete movement of the coin carrier, for bringing the commodity carrier to discharging position, substantially as described.

7. In a vending machine, the combination of a movable coin carrier adapted to receive and hold a coin and convey the same from its point of insertion to its point of discharge, a locking member secured to and movable with the coin carrier and adapted to be moved and held in unlocking position by the insertion of a coin in position on the coin carrier, a stationary member adapted to be engaged by said locking member for normally locking the coin carrier, and a discharging member actuated by a movement of the coin carrier, substantially as described.

BETHUEL M. DAVIS.

Witnesses:
E. WAINWRIGHT,
JAS. W. PENN.